(12) United States Patent  (10) Patent No.: US 7,686,115 B2
Parker  (45) Date of Patent: Mar. 30, 2010

(54) FRONT SUSPENSION AND STEERING SYSTEM FOR A MOTORCYCLE

(76) Inventor: James G. Parker, 229 Anita Pl., Santa Fe, NM (US) 87505

( * ) Notice: Subject to any disclaimer, the term of this patent is extended or adjusted under 35 U.S.C. 154(b) by 220 days.

(21) Appl. No.: 11/821,175

(22) Filed: Jun. 22, 2007

(65) Prior Publication Data

US 2008/0315550 A1 Dec. 25, 2008

(51) Int. Cl.
*B62K 21/02* (2006.01)
(52) U.S. Cl. .................................. 180/219; 280/276
(58) Field of Classification Search .............. 180/219; 280/276, 277
See application file for complete search history.

(56) References Cited

U.S. PATENT DOCUMENTS

| | | | |
|---|---|---|---|
| 4,082,307 A | | 4/1978 | Tait |
| 4,526,249 A | | 7/1985 | Parker |
| 4,583,612 A | | 4/1986 | Parker |
| 4,723,620 A | | 2/1988 | Ono |
| 4,741,545 A | * | 5/1988 | Honma et al. ................. 280/92 |
| 4,756,547 A | | 7/1988 | Trema |
| 4,785,905 A | | 11/1988 | Trema |
| 4,834,412 A | | 5/1989 | Trema |
| 5,054,572 A | | 10/1991 | Parker |
| 5,361,864 A | | 11/1994 | Tanaka |
| 5,417,305 A | | 5/1995 | Parker |
| 5,503,244 A | * | 4/1996 | Beirlein ..................... 180/219 |
| 5,782,313 A | | 7/1998 | Kurawaki et al. |
| 6,260,869 B1 | | 7/2001 | Hanlon et al. |

OTHER PUBLICATIONS

G. Kupper, J. Lohse; Die Radgeber; Motorarad Magazine MO; Mar. 2005; p. 52-61; Stuttgart, Germany.

* cited by examiner

*Primary Examiner*—Kevin Hurley
(74) *Attorney, Agent, or Firm*—William A. Eklund (57) ABSTRACT

A suspension and steering system for the front wheel of a motorcycle. The system includes an upright extending along one side of the front wheel at a rake angle, to which the wheel is journalled by means of a cantilevered axle extending from one side of the lower end of the upright. The upright includes a lower section that resides within the inner diameter of the wheel rim and an arcuate upper section that extends upwardly and rearwardly around the wheel rim and tire. The upper end of the upright is connected to a telescoping, splined steering shaft that is journalled to an upper subframe and which transmits steering torque from a handlebar assembly through the upright to the front wheel. The upright is pivotably attached to upper and lower swing arms that extend forwardly from the body of the motorcycle. The lower swing arm extends around the side of the front wheel and functions to locate the lower section of the upright. The upper swing arm is connected to the upper end of the upright and is sprung and damped with a shock absorber assembly connected to the upper subframe. The upright bears and transmits substantially all weight and shock loads between the front wheel and the upper swing arm and body of the motorcycle, allowing the steering shaft to function exclusively to transmit steering torque to the front wheel.

17 Claims, 5 Drawing Sheets

FRONT SUSPENSION AND STEERING SYSTEM FOR A MOTORCYCLE

CROSS-REFERENCE TO RELATED APPLICATIONS

Not applicable.

BACKGROUND OF THE INVENTION (1) Field of the Invention

The present invention is generally related to motorcycles, and in particular to front wheel suspension and steering systems for motorcycles.

(2) Description of the Related Art including information disclosed under 37 CFR 1.97 and 1.98

A front suspension and steering system in a motorcycle must be designed to bear a portion of the weight load of the motorcycle and to also absorb road shocks caused by irregularities in the road. This design objective of the suspension system is usually accomplished through a combination of springs and fluid-based dampers contained in the telescoping front fork tubes of a traditional motorcycle.

Another major design objective of the front suspension and steering system is to transmit steering torque from the rider to the front wheel, while at the same time providing straight-line tracking stability and also biasing the return of the front wheel from a turned position to a straight-line position during operation. These objectives are normally met through the selective application of rake angle, trail, and other design elements of traditional front fork assemblies.

It has been recognized that the suspension function and the steering function are in concept independent of one another and thus should ideally be separated from one another structurally, in part because the weight, size and design of the load-bearing components of the system are different that those necessary for the components of the steering system. Yet in most motorcycle designs these functions are combined in the structure of the suspension and steering system and thus they affect one another. For example, it would be desirable to transmit roads shocks from the front wheel to the body of the motorcycle, where the engine and thus the center of mass of the motorcycle are located, along the shortest and most direct path possible. Yet in the traditional motorcycle design all weight loads and road shocks are transmitted through the front fork tubes to the steering head, resulting in a steering head assembly that is heavier than necessary to support the steering function alone; and also resulting in all weight and shock loads being transmitted between the front wheel and the body of the motorcycle along an indirect and thus unnecessarily long path that includes the steering head.

Further, in the traditional design the application of steering torque to the front fork tubes affects the friction between the telescoping fork tubes and thus affects the response of the suspension system to road shocks. Also, because the traditional fork tubes are extended at a rake angle, weight and shock loads affect the friction in the telescoping tubes and thus their performance. As a consequence road shocks and weight loads affect the steering of the motorcycle; and, conversely, the application of steering torque affects the response of the suspension system to road shocks.

Accordingly, it is the object and purpose of the present invention to provide an improved suspension and steering system for the front wheel of a motorcycle.

More specifically, it is an object and purpose of the present invention to provide a suspension and steering system in which the suspension and steering functions are improved by being substantially separated from one another structurally.

It is also another object and purpose of the present invention to provide a suspension and steering system in which weight and shock loads are transmitted between the front wheel and the body of the motorcycle through structural components, including spring and damper elements, that are separate from the steering column of the motorcycle.

These and other objects and purposes are more fully set forth and will be evident from the drawings and detailed description of the invention set forth below.

BRIEF SUMMARY OF THE INVENTION

The present invention provides a front suspension and steering system for a motorcycle having a body and a front wheel, with the body as referred to herein generally meaning the engine, frame and other major mechanical components of the motorcycle. The system includes an upright that extends along one side of the front wheel at a suitable rake angle. The upright includes an integral lower section, to which the front wheel is journalled on side by means of a cantilevered axle assembly, and an integral arcuate upper section that extends around the side of the front wheel and tire. In a preferred embodiment the spokes of the wheel are offset to one side of the center line of the wheel rim, and the lower section of the upright is contained within the interior diameter of the wheel.

The system further includes upper and lower swing arms that extend forwardly from the body of the motorcycle and are pivotably attached to the upright. A telescoping steering column assembly is pivotably connected to the upper end of the upright and extends upwardly therefrom to a handlebar assembly.

In the preferred embodiment the steering column assembly includes a steering shaft that slides telescopically within a steering tube and is splined thereto by means of a linear bearing located within the steering tube. The steering shaft is preferably journalled for universal pivotal motion to a spherical bearing assembly located at the upper end of an upper subframe that extends upwardly and forwardly from the body of the motorcycle.

The preferred embodiment includes a shock absorber positioned between the upper subframe and the upper swingarm, by which weight and shock loads are borne and transmitted between the body of the motorcycle and the front wheel.

The lower swing arm curves around the same side of the front wheel as the upright, and is pivotably connected for universal pivotal motion to the lower section of the upright, so as to permit the upright to rotate during steering of the front wheel while also allowing the upright to swing vertically with respect the lower swing arm.

The steering tube is preferably connected to the upper end of the upright by a universal pivot plate, to allow the upright to undergo rotation during steering and also to undergo swinging motion at the ends of swing arms so as to bear weight loads and shock loads, while also transmitting steering torque from the handlebar assembly through the upright to the front wheel.

In the preferred embodiment the hub and spokes of the front wheel are offset laterally from the centerline of the front wheel and the motorcycle, to allow the lower section of the upright to reside entirely within the inside circumference of the front wheel rim.

The preferred embodiment further includes a pair of brake disks affixed to a live axle to which the wheel is also affixed, with the brake disks being located on opposite sides of the upright; and with a pair of brake calipers being mounted to the lower section of the upright and positioned to engage the brake disks.

These and other aspects of the invention are more fully described in the accompanying drawings and in the detailed description of the preferred embodiment set forth below.

BRIEF SUMMARY OF THE SEVERAL VIEWS OF THE DRAWINGS

The attached drawings form a part of and are incorporated into the specification. In the drawings.

The drawings will be best understood when taken with the following detailed description of the invention.

DETAILED DESCRIPTION OF THE INVENTION

Referring to the Figures, a motorcycle 10 constructed in accordance with a preferred embodiment of the present invention is shown as having certain traditional components including a front wheel 12 and front tire 14, rear wheel 16 and rear tire 18, engine 20, seat 22, a 4-into-1 exhaust pipe assembly 24, and a muffler 26. The approximate location of a portion of a combined fairing and windshield is shown as phantom outline 28. While these elements are identified as traditional, nothing in the description that follows should be interpreted as suggesting that any of the other elements, described below, are considered traditional or prior art.

The engine 20 is supported by a rear frame 30. Attached to the rear frame 30 and the engine 20 are left and right side plates 32 and 34, respectively, which are affixed to the rear frame 30 and extend generally forwardly therefrom along opposite sides of the engine 20.

The seat 22 is supported by a rear subframe 36 that extends upwardly and rearwardly from the rear frame 30.

Figure 1:
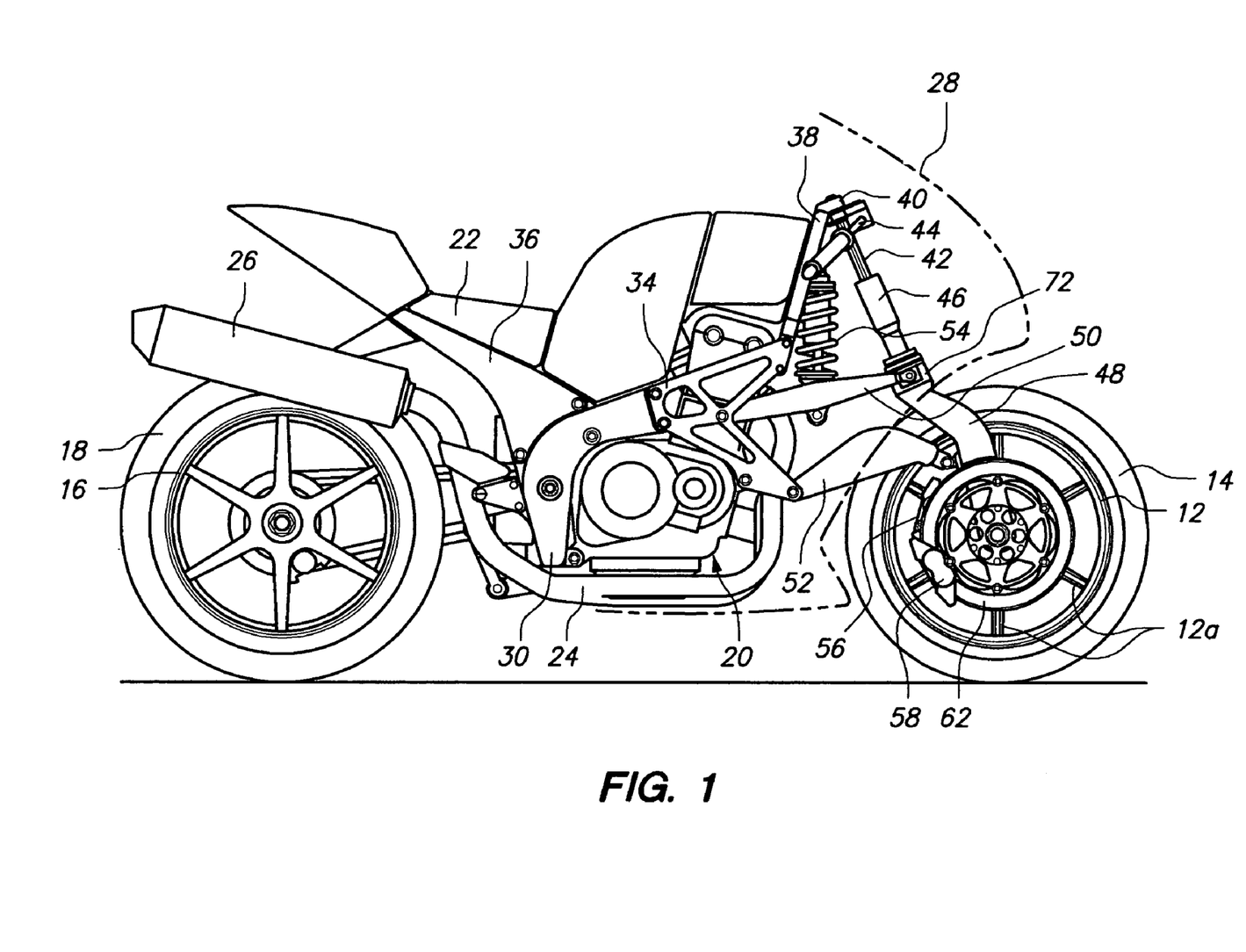
FIG. 1 is a side view of a motorcycle having a front suspension and steering system constructed in accordance with a preferred embodiment of the present invention.
Figure 2:
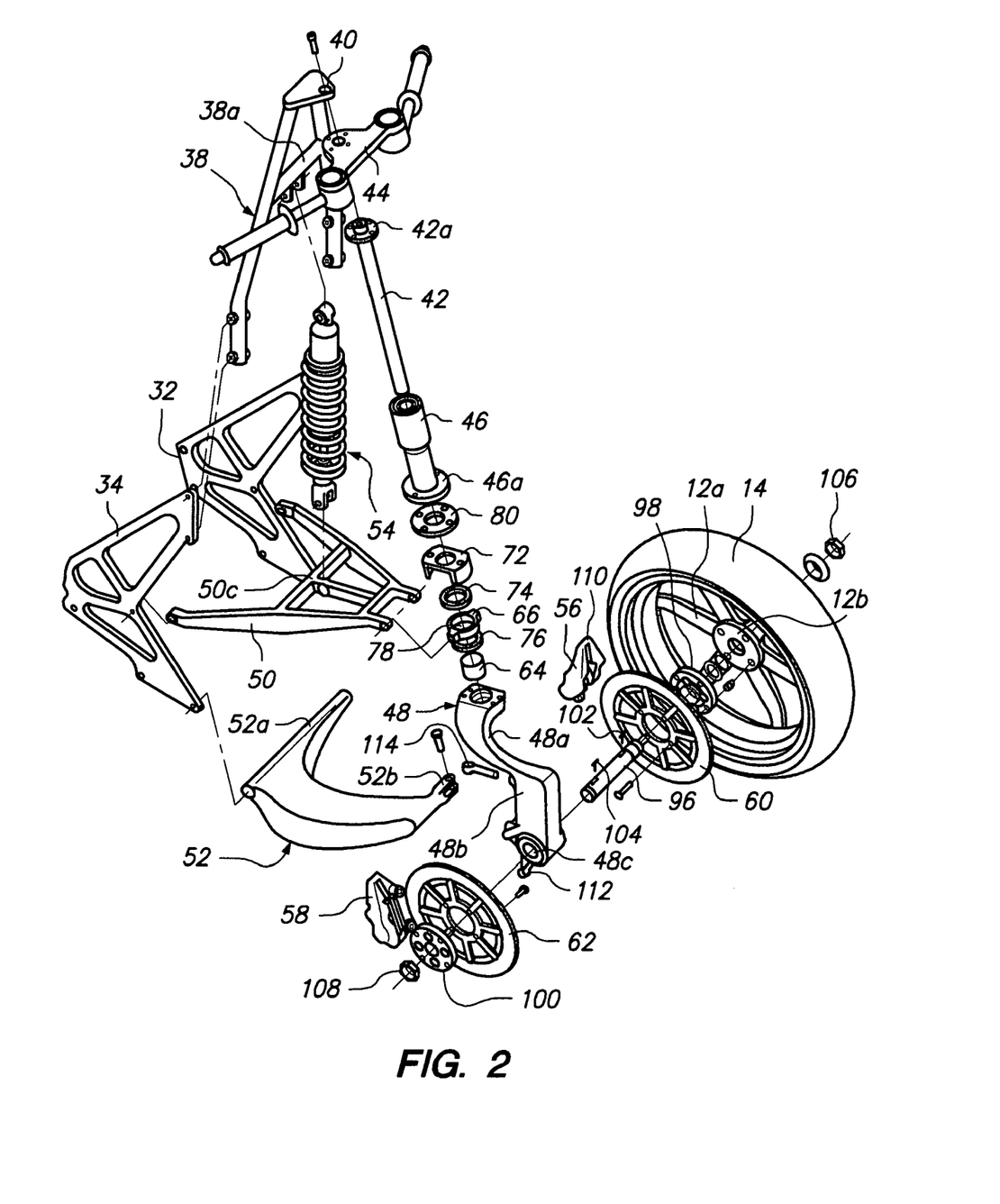
FIG. 2 is an exploded isometric view of the suspension and steering system of the FIG. 1.
Figure 3:
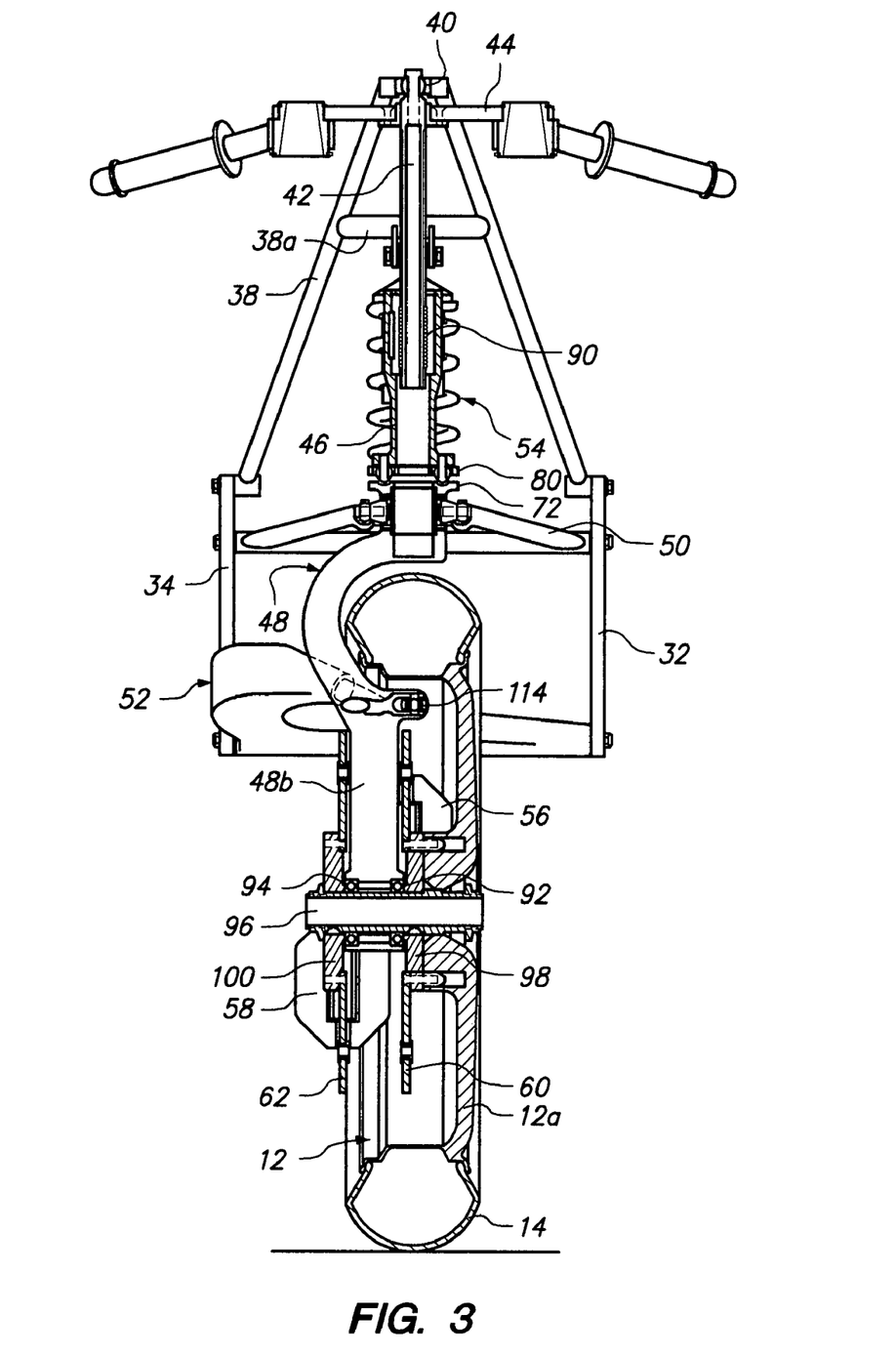
FIG. 3 is a front view in partial cross section of the suspension and steering system.

A forward upper subframe 38 has generally the shape of an inverted V (FIGS. 2 and 3). The lower ends of the upper subframe 38 are affixed to the upper forward corners of side plates 32 and 34. The subframe 38 extends upwardly and forwardly therefrom and includes a spherical bearing assembly 40 at its upper end, in which is journalled the upper end of a steering shaft 42.

Figure 4:
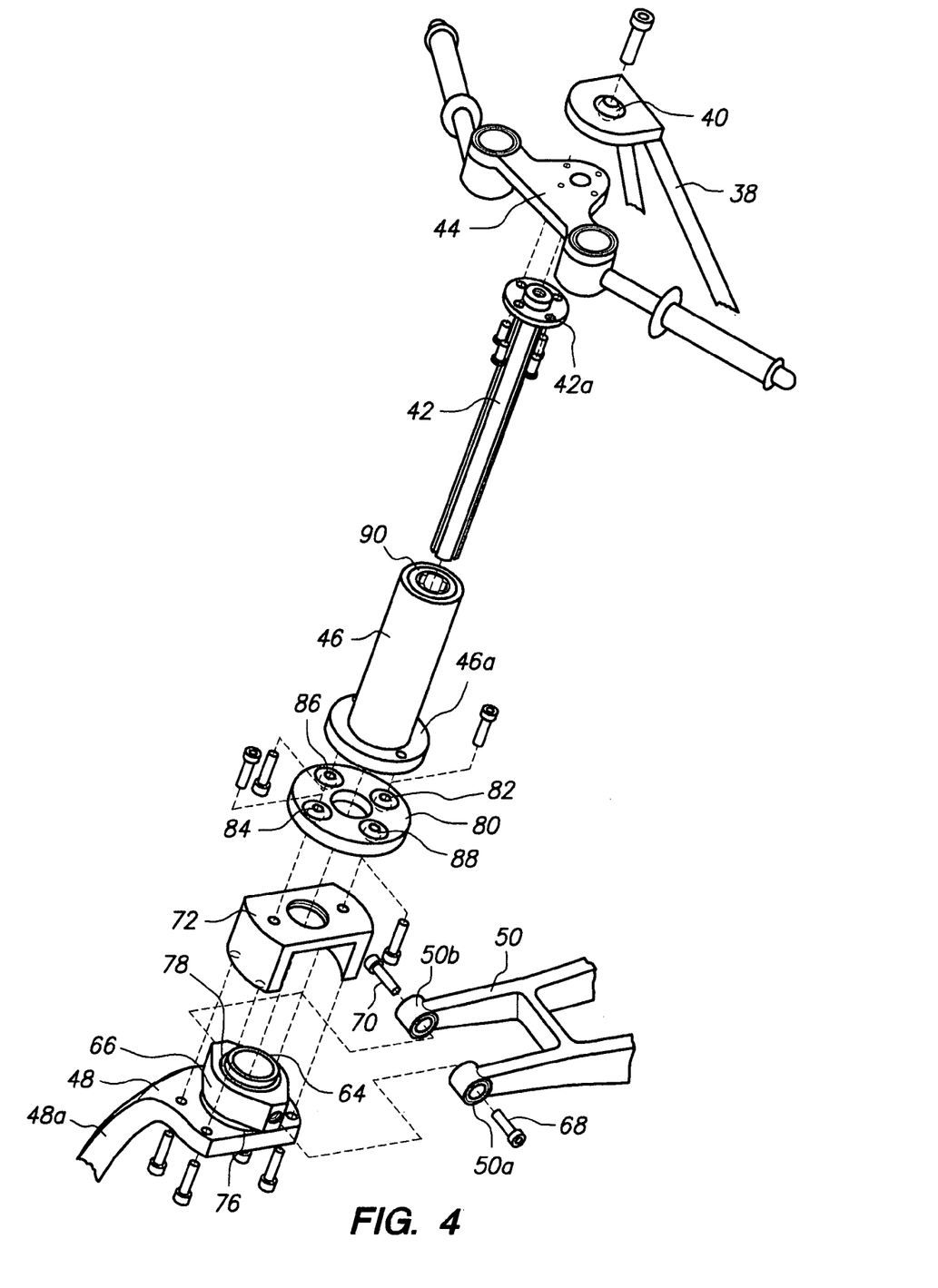
FIG. 4 is an exploded isometric view of the upper end of the suspension and steering system.
Figure 5:
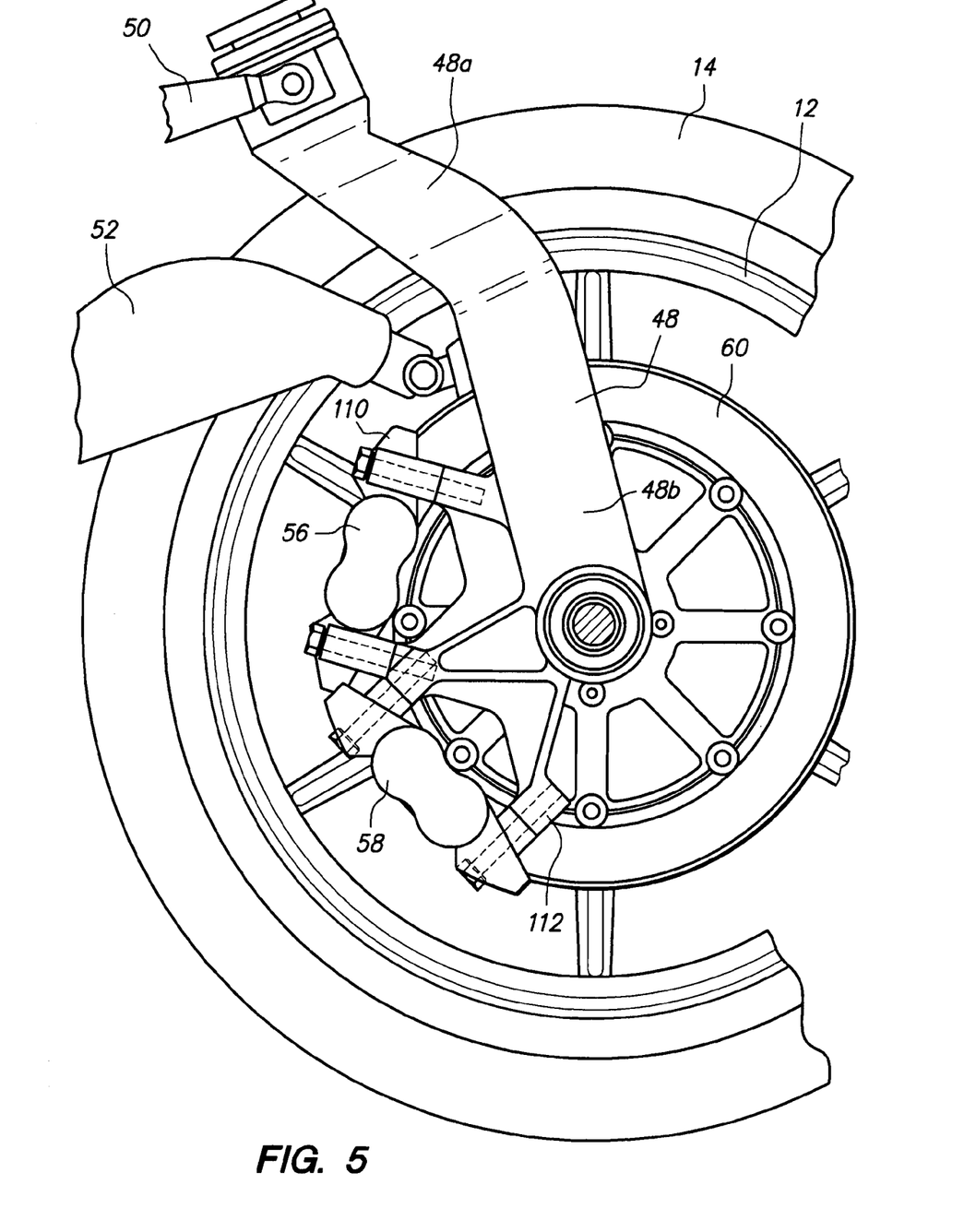
FIG. 5 is an enlarged side view in partial cross section of the upright to which the front wheel is journalled in cantilever fashion.

A handlebar assembly 44 is suitable for supporting associated brake and clutch levers, controls, grips and the like (not shown). The handlebar assembly 44 is affixed to an integral flange 42a at the upper end of the steering shaft 42 (FIGS. 3 and 4).

Generally, the steering shaft 42 is slidably engaged in a steering tube 46, and is splined thereto by means of a linear bearing described below. The steering shaft 42 and steering tube 46 together constitute a telescoping steering column assembly by which steering torque is applied to the front wheel 12 through an upright 48. The lower end of the steering tube 46 is pivotably connected, as further described below, to the upright 48, to which the front wheel 12 is journalled by means of a cantilevered axle assembly described further below. In the illustrated embodiment the upright 48 extends along the right side of the front wheel 12 and is oriented at a rake angle that is approximately the same as the rake angle of the combined steering shaft 42 and steering tube 46. During operation of the motorcycle, steering torque is transmitted from the handlebar assembly 44 through the steering shaft 42, the steering tube 46 and the upright 48, to turn the front wheel 12.

A V-shaped upper swing arm 50 and an arcuate, single-sided lower swing arm 52 extend forwardly from the side plates 32 and 34 and are pivotably connected to the upright 48, also as further described below. The lower swing arm 52 is sufficiently arcuate to accommodate turning motion of the front wheel 12 through its entire steering range of rotation.

A sprung and damped shock absorber 54 is connected at its upper end to an integral cross member 38a of the upper frame 38. Shock absorber 54 is connected at its lower end to an integral cross member 50c of the upper swing arm 50.

Left and right caliper brake assemblies 56 and 58, respectively, are affixed to the upright 48 and act on a pair of left and right floating brake disks 60 and 62, respectively.

Briefly, during operation most of the weight load of the motorcycle on the front wheel 12 is borne by the upright 48, the upper swing arm 50, the shock absorber 54, and the upper frame 38. The lower swing arm 52 functions primarily to locate and stabilize the upright 48 and the front wheel 12, and does not bear a significant fraction of the weight load of the motorcycle. Likewise the steering shaft 42 and steering tube 46 do not bear a significant fraction of the weight load. This reduces steering bearing friction and allows the steering shaft 42 and tube 46 to function primarily to transmit steering torque to the front wheel 12.

In more detail, a tubular yoke sleeve 64 (see FIGS. 2 and 4 in particular) extends from a cylindrical socket opening on the upper end of the upright 48. The yoke sleeve 64 is enclosed by a tubular steering yoke 66. The steering yoke 66 includes integral bearing pins 68 and 70 that extend radially from opposite sides of the yoke 66. The steering yoke 66 is maintained in place by an upright cap 72 that is bolted to the upper surface of the upright 48.

The steering yoke 66 is contained at its upper and lower ends by upper and lower thrust bearings 74 and 76, respectively, which encircle the yoke sleeve 64 and which bear the major portion of the weight and shock loads on the front wheel 12. The yoke 66 rotates about the yoke sleeve 64 on a set of radial needle bearings 78, which are contained between the yoke sleeve 64 and the yoke 66.

The upper swing arm 50 includes two bearing bosses 50a and 50b, which are journalled to the steering yoke bearing pins 68 and 70. The upper arm also includes an integral cross member assembly 50c, to which the lower end of shock absorber 54 is pivotably attached. It will be seen that when the forward end of the upper swing arm 50 swings upwardly along with the upright 48, in response to weight loads on the motorcycle 10 or road shock loads on the front wheel 12, the shock absorber 54 is compressed against the cross member 38a of the upper frame 38.

The upright cap 72 is open on its left and right sides to allow the yoke bearing pins 68 and 70 to extend therethrough, with sufficient angular clearance to allow the upright cap 72 and the attached upright 48 to undergo rotation over the maximum steering angle of the front wheel 12 in both the left and right directions. It will be seen that the yoke 66 and its radial bearing pins 68 and 70 do not rotate about the steering axis, but rather remain pivotably attached to the forward end of the upper swing arm 50.

A universal pivot plate 80 is interposed between the upper surface of the upright cap 72 and the lower surface of an integral flange 46a which extends radially from the lower end of the steering tube 46. More particularly, the universal plate 80 contains four bored ball bearings 82, 84, 86 and 88 and associated bolts which pass through the ball bearings. Two of the bolts extend downwardly though the plate 80 and ball bearings 82 and 84 and connect the universal plate 80 to the upper surface of the cap 72; and two of the bolts extend upwardly through bearings 86 and 88 and connect the plate 80 to the flange 46a. The bolts also function to locate the spherical bearings 82-88 in their respective sockets in the plate 80. This assembly allows the plate 80 and the steering tube 46 to rock slightly fore and aft with respect to the upright 48 on bearings 82 and 84, while also allowing the plate 80 and steering tube 46 to rock slightly from side to side with respect to the upright 48 on bearings 86 and 88. Rocking on both pairs of bearings in orthogonal directions, i.e., so as to achieve universal pivotal motion, is necessary to accommodate swinging motion of the swing arms 50 and 52 while also accommodating steering rotation of the front wheel 12 and the upright 48 upon application of steering torque to the steering tube 46.

The steering shaft 42 slides axially within the steering tube 46 on a linear bearing assembly 90, which functions to permit the steering tube 42 to travel freely in translation axially within the tube 46, while also functioning as a spline to prevent rotation of the shaft 42 with respect to the tube 46 and to thereby transmit steering torque from the steering shaft 42 to the steering tube 46.

The upright 48 includes an integral arcuate upper section 48a that curves around the front tire 14 and the rim of wheel 12, and an integral lower section 48b that resides within the inside diameter of the front wheel 12 and which includes a transverse axle bore 48c. In this regard, the front wheel 12 includes laterally offset integral spokes 12a and an associated wheel hub 12b, which allow the spokes 12a, and hub 12b, and the lower section 48b of the upright to all be positioned within the inside diameter of the rim of wheel 12.

It will be noted that both the upper section 48a of the upright 48 and the lower swing arm 53 extend around the side of the front wheel 12. While the lower swing arm 52 must accommodate steering rotation of the front wheel 12, the upright 48 rotates with the front wheel 12 during steering rotation. Consequently the upper section 48a of the upright 48 need only have a radius of curvature that is sufficient to clear the front wheel 12 and tire 14.

Referring in particular to FIGS. 2 and 3, left and right front wheel bearings 92 and 94 are set into-the axle bore 48c. A live front axle 96 is journalled in the bearings 92 and 94 and extends from both sides thereof. The left and right front brake disks 60 and 62 are affixed to the axle 96 on opposite sides of the lower upright section 48b, with brake disk 60 being located between the lower upright section 48b and the wheel hub 12b. More specifically, the left and right brake disks 60 and 62 are floating brake disks that are bolted to left and right brake disk mounting plates 98 and 100, respectively, and which are in turn affixed to the axle 96 and secured against rotation with respect thereto by means of locking bosses 102 and 104.

The wheel hub 12b is bolted to the left mounting plate 98. A pair of axle nuts 106 and 108 at the opposite ends of the axle 96 maintain the wheel 12, the brake disk mounting plates 98 and 100, and the axle 96 in position and journalled in the wheel bearings 92 and 94.

A pair of left and right brake caliper mounting brackets 110 and 112 are affixed to, and extend generally rearwardly from, the lower upright section 48b. The left and right brake caliper assemblies 56 and 58 are, in turn, affixed to the brackets 110 and 112, respectively, and are positioned to engage the brake disks 60 and 62. It will be noted that the use of two brake disks and associated caliper brake assemblies on opposite sides of the upright 48, yet with both being located within the confines of the inner diameter of the front wheel 12, minimizes undesirable steering effects that might otherwise arise from braking forces applied to a single-sided front suspension system, while also permitting the use of multiple brake pistons and pads in each brake caliper assembly.

The lower swing arm 52 has a complex arcuate shape (FIG. 2). Like the arcuate upper section 48a of upright 48, the lower swing arm 52 curves around the front wheel 12 and tire 14. However, the lower swing arm 52 does not rotate with the wheel 12 during steering, as does the upper section 48a of upright 48. Consequently the lower swing arm 52 has a greater arc of curvature, so as to provide sufficient clearance to allow the front wheel 12 to rotate through its entire maximum range of steering rotation. In this regard, the lower swing arm 52 includes a wide rear end 52a that extends between the lower front corners of the left and right side plates 32 and 34, and which is hinged thereto for swinging motion in a vertical plane that is parallel to the fore-and-aft vertical center plane of the motorcycle.

At its forward end the lower swing arm 52 terminates in a small fork 52b, to which is a attached a ball joint assembly 114 that is affixed to the rear side of the lower upright section 48b, and which is centered in the center plane of the front wheel 12. The ball joint assembly 114 permits the upright 48 and the front wheel 12 to turn left and right with respect to the lower arm 52, while also undergoing limited vertical swinging translation with respect to the upper arm 52. As a result the lower swing arm 52 functions primarily to locate and stabilize the lower section 48b of upright 48, and does not function to transmit significant weight or shock loads between the main body of the motorcycle and the front wheel 12, as does the upper swing arm 52.

In operation, the upright 48 travels upward and downward relative to the body of the motorcycle in response to weight loads on the motorcycle and road shock loads on the front wheel 12, while being simultaneously and independently rotated by the steering shaft 42 and steering tube 46 in response to steering torque applied by the rider.

It is to be noted that the upright 48 rotates approximately but not always exactly about the common axis of the steering shaft 42 and steering tube 46. In this regard, the suspension settings and the dimensions of the swing arms 50 and 52 and the upright 48 are all configured so that the axis of rotation of the upright 48 is nominally aligned with the axis of rotation of the steering shaft 42 and tube 46 in a normal riding situation. However, during operation of the motorcycle the axis of rotation of the upright 48 is not always precisely aligned with the axis of the steering shaft 42 and steering tube 46 because of the operation of the universal pivot plate 80, which allows for a small but operationally insignificant angular deviation between these two axes as the upright 48 undergoes swinging translational displacement relative to the motorcycle body due to weight loads or road shocks.

The spherical bearing assembly 40 at the upper end of the steering shaft 42 similarly allows for a very small angular variation between the axis of the steering shaft 42 and the fixed subframe 38 and body of the motorcycle, which is necessary to accommodate swinging translation of the upright 48 about the swing arms 50 and 52. However this angular variation is so small as to be operationally insignificant.

Road shock loads, for example, are transmitted upwardly through the front wheel 12, the upright 48, and the steering yoke 66 to the upper swing arm 50, from which the shock load is transmitted to the shock absorber 54 and ultimately to the upper frame 38 and through the side plates 32 and 34 to the body of the motorcycle.

It should also be noted that the present invention allows the steering shaft 42 and tube 46 to function exclusively as a steering column, i.e., to transmit steering torque from the rider to the front wheel 12. Since the steering shaft 42 and steering tube 46 do not support the weight of the motorcycle, as do the fork and steering head of a conventional motorcycle, the steering shaft 42 and tube 46 can be made smaller and lighter while at the same time meeting the design objectives for the steering column.

While the present invention is described and illustrated herein by reference to a preferred embodiment, it will be understood that various modifications, substitutions and other alterations may be made by one skilled in the art without departing from the present invention. Accordingly, the present invention is defined only by the following claims.

The embodiments of the invention in which patent protection is claimed are defined as follows:

1. A front suspension and steering system for a motorcycle having a body and a front wheel, comprising:
    an upright extending along one side of said front wheel at a rake angle, said upright having an integral arcuate upper section that extends around said one side of said front wheel and terminates at an upper end of said upright, and an integral lower section that terminates at a lower end of said upright, to which said front wheel is journalled on a cantilevered live front axle extending from said lower end of said upright;
    said live front axle being journalled to said lower end of said upright and said front wheel being affixed to said axle, and further including left and right brake disks affixed to said axle on opposite sides of said lower end of said upright, and left and right caliper brake assemblies mounted to said upright and positioned to engage said brake disks;
    upper and lower swing arms extending forwardly from said body of said motorcycle and being pivotably attached to said upright; and
    a telescoping steering column assembly pivotably connected to said upper end of said upright and extending upwardly therefrom to a handlebar assembly.

2. The front suspension and steering system for a motorcycle as defined in claim 1 wherein said telescoping steering column assembly includes a steering shaft slidably engaged in a steering tube, and wherein said handlebar assembly and said steering shaft are journalled to an upper subframe extending from said motorcycle body.

3. The front suspension and steering system for a motorcycle as defined in claim 2 further including a shock absorber assembly extending between and connected to said upper subframe and said upper swing arm.

4. The front suspension and steering system for a motorcycle as defined in claim 1 further including a steering yoke journalled to said upper end of said upright, said upper arm having a forward end hinged to said steering yoke.

5. The front suspension and steering system for a motorcycle as defined in claim 1 wherein said upper and lower swing arms are affixed to and extend from left and right side plates affixed to a frame of said motorcycle body.

6. The front suspension and steering system for a motorcycle defined in claim 1 wherein said steering tube is pivotably connected to said upper end of said upright through a universal plate.

7. The front suspension and steering system for a motorcycle as defined in claim 1 wherein said lower swing arm includes a rear end that is hinged to said motorcycle body for vertical swinging motion, and a forward end that is pivotably connected to said lower end of said upright for universal pivotal motion.

8. The front suspension and steering system for a motorcycle as defined in claim 2 wherein said steering tube is pivotably connected to said upright by a universal pivot plate.

9. A front suspension and steering system for a motorcycle having a body and a front wheel, comprising:
    an upright extending along one side of said front wheel, said upright including an integral arcuate upper section that extends around said one side of said front wheel and which terminates at an upper end of said upright, and an integral lower section that is located within the inside diameter of said front wheel and which terminates at a lower end of said upright, said front wheel being journalled to said lower end of said upright on one end of a cantilevered live front axle extending through said lower end of said upright;
    said live front axle being journalled to said lower end of said upright and said front wheel including laterally offset spokes and a laterally offset hub, and wherein said hub is affixed to said axle, and further including left and right brake disks affixed to said axle on opposite sides of said lower end of said upright, and left and right caliper brake assemblies mounted to said upright and positioned to engage said brake disks;
    upper and lower swing arms extending forwardly from said body of said motorcycle and being pivotably attached to said upright, said upper swing arm being pivotably connected to said upper end of said upright and said lower swing arm extending around said one side of said front wheel and being connected to said lower section of said upright for universal pivotal motion;
    a telescoping steering column assembly pivotably connected to said upper end of said upright for universal pivotal motion and extending upwardly therefrom to a handlebar assembly.

10. The front suspension and steering system for a motorcycle as defined in claim 9 wherein said telescoping steering column assembly includes a steering shaft slidably engaged in splined relationship in a steering tube by means of a linear bearing contained in said steering tube, and wherein said handlebar assembly and said steering shaft are journalled to an upper subframe extending from said motorcycle body.

11. The front suspension and steering system for a motorcycle as defined in claim 10 wherein said steering tube is pivotably connected for universal pivotal motion to said upper end of said upright by a universal pivot plate.

12. The front suspension and steering system for a motorcycle as defined in claim 11 further including an upper subframe extending upwardly and forwardly from said motorcycle body, and wherein said handlebar assembly is journalled to said upper subframe by a spherical bearing assembly which permits universal pivotal motion of said steering tube relative to said upper subframe.

13. A front suspension and steering system for a motorcycle having a body and a front wheel, comprising:
    an upright extending along one side of said front wheel, said upright including an integral arcuate upper section that extends around said one side of said front wheel and which terminates at an upper end of said upright, and an integral lower section that terminates at a lower end of said upright;

a live front axle journalled in said lower end of said upright and extending from opposite sides thereof;

left and right brake disks being affixed to said live front axle adjacent to and on opposite sides of said lower end of said upright;

said front wheel being affixed to one end of said live front axle such that said one side of said front wheel faces said upright, and with one of said brake disks being located between said front wheel and said upright;

left and right caliper brake assemblies mounted to said upright and positioned to engage said left and right brake disks, respectively;

upper and lower swing arms extending forwardly from said body of said motorcycle and being pivotably attached to said upright, said upper swing arm being pivotably connected to said upper end of said upright, said lower swing arm extending around said one side of said front wheel and being connected for universal pivotal motion to said upright at a point along said integral lower section of said upright; and a telescoping steering column assembly pivotably connected to said upper end of said upright for universal pivotal motion and extending upwardly therefrom to a handlebar assembly.

14. The front suspension and steering system for a motorcycle as defined in claim 13 wherein said telescoping steering column assembly includes a steering shaft slidably engaged in splined relationship in a steering tube by means of a linear bearing contained in said steering tube, and wherein said handlebar assembly and said steering shaft are journalled to an upper subframe extending from said motorcycle body.

15. The front suspension and steering system for a motorcycle as defined in claim 13 wherein said steering tube is pivotably connected for universal pivotal motion to said upper end of said upright by a universal pivot plate.

16. The front suspension and steering system for a motorcycle as defined in claim 13 further including an upper subframe extending upwardly and forwardly from said motorcycle body, and wherein said handlebar assembly is journalled to said upper subframe by a spherical bearing assembly which permits universal pivotal motion of said steering tube relative to said upper subframe.

17. The front suspension and steering system for a motorcycle as defined in claim 14 wherein said front wheel includes a wheel rim and wheel spokes that are offset to one side of the center line of the wheel, and said lower section of the upright is contained within the interior diameter of said wheel rim.

* * * * *